United States Patent
O'Herlihy et al.

(10) Patent No.: US 11,481,724 B2
(45) Date of Patent: Oct. 25, 2022

(54) SYSTEM AND METHOD FOR DIRECT STORE DISTRIBUTION

(71) Applicant: Everseen Limited, Blackpool (IE)

(72) Inventors: Alan O'Herlihy, Glenville (IE); Razvan-Dorel Cioarga, Oradea (RO); Bogdan Ciubotaru, Donoughmore (IE)

(73) Assignee: Everseen Limited, Blackpool (IE)

( * ) Notice: Subject to any disclaimer, the term of this patent is extended or adjusted under 35 U.S.C. 154(b) by 32 days.

(21) Appl. No.: 17/159,334

(22) Filed: Jan. 27, 2021

(65) Prior Publication Data

US 2021/0233016 A1 Jul. 29, 2021

Related U.S. Application Data

(60) Provisional application No. 62/967,232, filed on Jan. 29, 2020.

(51) Int. Cl.
*G06Q 10/08* (2012.01)
*G06K 9/62* (2022.01)
*G06V 20/13* (2022.01)

(52) U.S. Cl.
CPC ......... *G06Q 10/087* (2013.01); *G06K 9/6267* (2013.01); *G06Q 10/0832* (2013.01); *G06Q 10/0833* (2013.01); *G06V 20/13* (2022.01)

(58) Field of Classification Search
CPC ............ G06Q 10/087; G06Q 10/0832; G06Q 10/0833; G06K 9/6267; G06V 20/13; G06V 20/10; G06V 20/52
See application file for complete search history.

(56) References Cited

U.S. PATENT DOCUMENTS

| 9,826,213 B1 | 11/2017 | Russell et al. |
| 9,827,683 B1 | 11/2017 | Hance et al. |
| 2013/0328661 A1 | 12/2013 | Phillips et al. |

(Continued)

OTHER PUBLICATIONS

Automated Tracking of Pallets in Warehouses: Beacon Layout and Asymmetric Ultrasound Observation Models Sep. 2007 (Year: 2007).*

(Continued)

*Primary Examiner* — Florian M Zeender
*Assistant Examiner* — Nicole Elena Bruner
(74) *Attorney, Agent, or Firm* — Young Basile Hanlon & MacFarlane, P.C.

(57) ABSTRACT

A system for performing automated auditing of goods includes an audit robot that includes a rotatable platform, and an overhead camera, a multi-tracking camera system, an audit controller configured to receive and process the one or more images to detect a delivery personnel and corresponding pallet of goods when the delivery personnel enters the warehousing environment, generate an alert to instruct the delivery personnel to keep the pallet on the platform of the audit robot, trigger the rotatable platform to rotate when the pallet is kept, trigger the overhead sensor and the multi-tracking camera system to generate image data of the pallet, while the platform is being rotated, process at least one of: image data, scanning data, order and supplier information, historical information, time, and identity of the delivery personnel to assess a risk level of the pallet, and automatically check-in the pallet when risk level is assessed as zero.

17 Claims, 3 Drawing Sheets

(56) References Cited

U.S. PATENT DOCUMENTS

| | | | | |
|---|---|---|---|---|
| 2013/0346261 | A1* | 12/2013 | Phillips | G06F 3/0486 |
| | | | | 705/28 |
| 2015/0066550 | A1* | 3/2015 | Harada | G06Q 10/063 |
| | | | | 705/7.11 |
| 2016/0117635 | A1* | 4/2016 | Parker | G06Q 10/087 |
| | | | | 705/28 |
| 2017/0091701 | A1* | 3/2017 | Stonecipher | G06Q 10/087 |
| 2018/0336514 | A1* | 11/2018 | Ranjanghatmuralidhar | |
| | | | | G06F 16/90335 |
| 2020/0089237 | A1* | 3/2020 | Whitaker | G05D 1/0297 |
| 2021/0241211 | A1* | 8/2021 | Oprea | G06K 19/07758 |
| 2022/0051175 | A1* | 2/2022 | O'Herlihy | H04N 7/181 |

OTHER PUBLICATIONS

Anonymous: 11 Facial recognition system—Wikipedia 11, Jan. 19, 2020 (Jan. 19, 2020), XP055794872, Retrieved from the Internet: URL:https://en.wikipedia.org/w/index.php?title=Facial_recognition_system&oldid=936610109.

Anonymous: 11 Video tracking—Wikipedia 11, Nov. 18, 2019 (Nov. 18, 2019),XP055794873, Retrieved from the Internet: URL:https://en.wikipedia.org/w/index.php?title=Video_tracking&oldid=926758150.

International Search Report for Application No. PCT/IB2021/050616, dated May 12, 2021.

* cited by examiner

SYSTEM AND METHOD FOR DIRECT STORE DISTRIBUTION

CROSS REFERENCE TO RELATED APPLICATION(S)

This application claims priority to and the benefit of U.S. Provisional Patent Application No. 62/967,232, filed Jan. 29, 2020, the entire disclosure of which is hereby incorporated by reference.

TECHNICAL FIELD

The present disclosure relates generally to automation of audition of received goods at a store. More specifically, it relates to verifying that the goods received are intact, and matches with the delivery order.

BACKGROUND

In a distribution system, order fulfilment is a key process in managing the supply chain. It includes generating, filling, delivering and servicing customer orders. A typical order fulfillment process includes various sub-processes such as receiving order, picking an order, packing an order, and shipping the order. Receiving refers to the acceptance and storage of incoming inventory at a fulfillment center. When the fulfillment center receives the inventory, the items may be stored in dedicated warehousing locations. Existing systems rely on human intervention to complete the receiving process, however, there are chances of errors in the manual process.

The receiving process is very important, as it is important to receive the right product, in the right quantities, in the right condition, weight and dimensions all at the right time. It is not uncommon to see small and mid-sized warehouses struggle with operational inefficiencies. The proper receiving of goods would have a direct impact on all subsequent warehouse processes.

There are many inaccuracies observed during the manual auditing process currently implemented by most store delivery activities. Also, the amount of time spent during an audit generates congestion when multiple deliveries happen to arrive at the same time. This usually leads to process breaches and rushed/incomplete verifications of the received goods.

SUMMARY

In one aspect of the present disclosure, there is provided a system for performing automated auditing of goods in a warehousing environment. The system includes an audit robot that includes a rotatable platform, and an overhead camera configured to capture an overhead image of the rotatable platform. The system further includes a multi-tracking camera system that includes a plurality of cameras installed in the warehousing environment to capture one or more images of the warehousing environment. The system further includes an audit controller that includes a memory to store one or more instructions, and a processor communicatively coupled to the memory, and configured to execute the one or more instructions stored in the memory. The processor is configured to receive and process the one or more images to detect a delivery personnel and corresponding pallet of goods when the delivery personnel enters the warehousing environment. The processor may be further configured to generate an alert to instruct the delivery personnel to keep the pallet on the platform of the audit robot. The processor may be further configured to trigger the rotatable platform to rotate when the pallet is kept. The processor may be further configured to trigger the overhead sensor and the multi-tracking camera system to generate image data of the pallet, while the platform is being rotated. The processor may be further configured to process at least one of: image data, scanning data, order and supplier information, historical information, time, and identity of the delivery personnel to assess a risk level of the pallet. The processor may be further configured to automatically check-in the pallet, and generate another alert to instruct the delivery personnel to leave the pallet at a designated storage area of the warehousing environment when the risk level is assessed as zero.

In another aspect of the present disclosure, there is provided a method for performing automated auditing of goods in a warehousing environment. The method includes receiving and processing the one or more images to detect a delivery personnel and corresponding pallet of goods when the delivery personnel enters the warehousing environment. The method may further include generating an alert to instruct the delivery personnel to keep the pallet on a platform of an audit robot. The method may further include triggering the rotatable platform to rotate when the pallet is kept, and generating image data of the pallet, while the platform is being rotated. The method may further include processing at least one of: image data, scanning data, order and supplier information, historical information, time, and identity of the delivery personnel to assess a risk level of the pallet, and automatically checking-in the pallet, and generating another alert to instruct the delivery personnel to leave the pallet at a designated storage area of the warehousing environment when the risk level is assessed as zero.

In yet another aspect of the present disclosure, there is provided a computer programmable product for performing automated auditing of goods in a warehousing environment. The computer programmable product comprising a set of instructions, the set of instructions when executed by a processor causes the processor to receive and process the one or more images to detect a delivery personnel and corresponding pallet of goods when the delivery personnel enters the warehousing environment, generate an alert to instruct the delivery personnel to keep the pallet on a platform of an audit robot, trigger the rotatable platform to rotate when the pallet is kept, generate image data of the pallet, while the platform is being rotated, process at least one of: image data, scanning data, order and supplier information, historical information, time, and identity of the delivery personnel to assess a risk level of the pallet, and automatically check-in the pallet, and generate another alert to instruct the delivery personnel to leave the pallet at a designated storage area of the warehousing environment when the risk level is assessed as zero.

Various embodiments of the present disclosure provide an intelligent risk-based audit process based on historic feedback loop combined with a learning process, integrated multi-camera tracking system for wide coverage area of the process audit system, and automatic robot for auditing, risk assessment and triage.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1A:
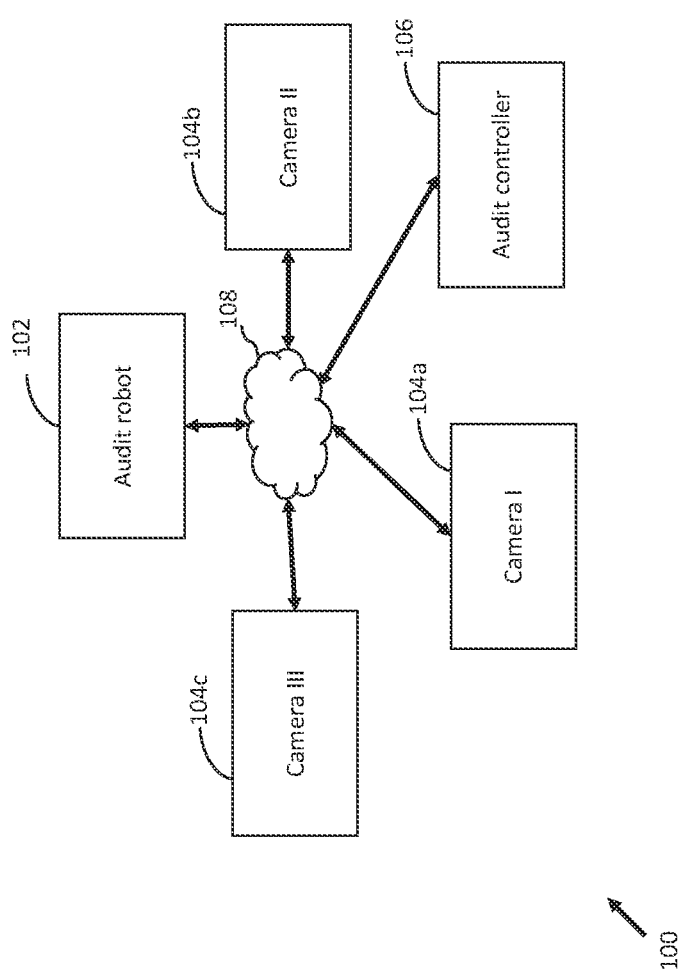
FIG. 1A is a block diagram of a system 100 for performing automated auditing of goods, in accordance with an embodiment of the present disclosure.

FIG. 1A is a block diagram of a system 100 for performing automated auditing of goods, in accordance with an embodiment of the present disclosure. The system 100 includes an audit robot 102, first through third cameras 104a till 104c, and an audit controller 106, each communicatively coupled to each other through a communication network 108. The communication network 108 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

Figure 1B:
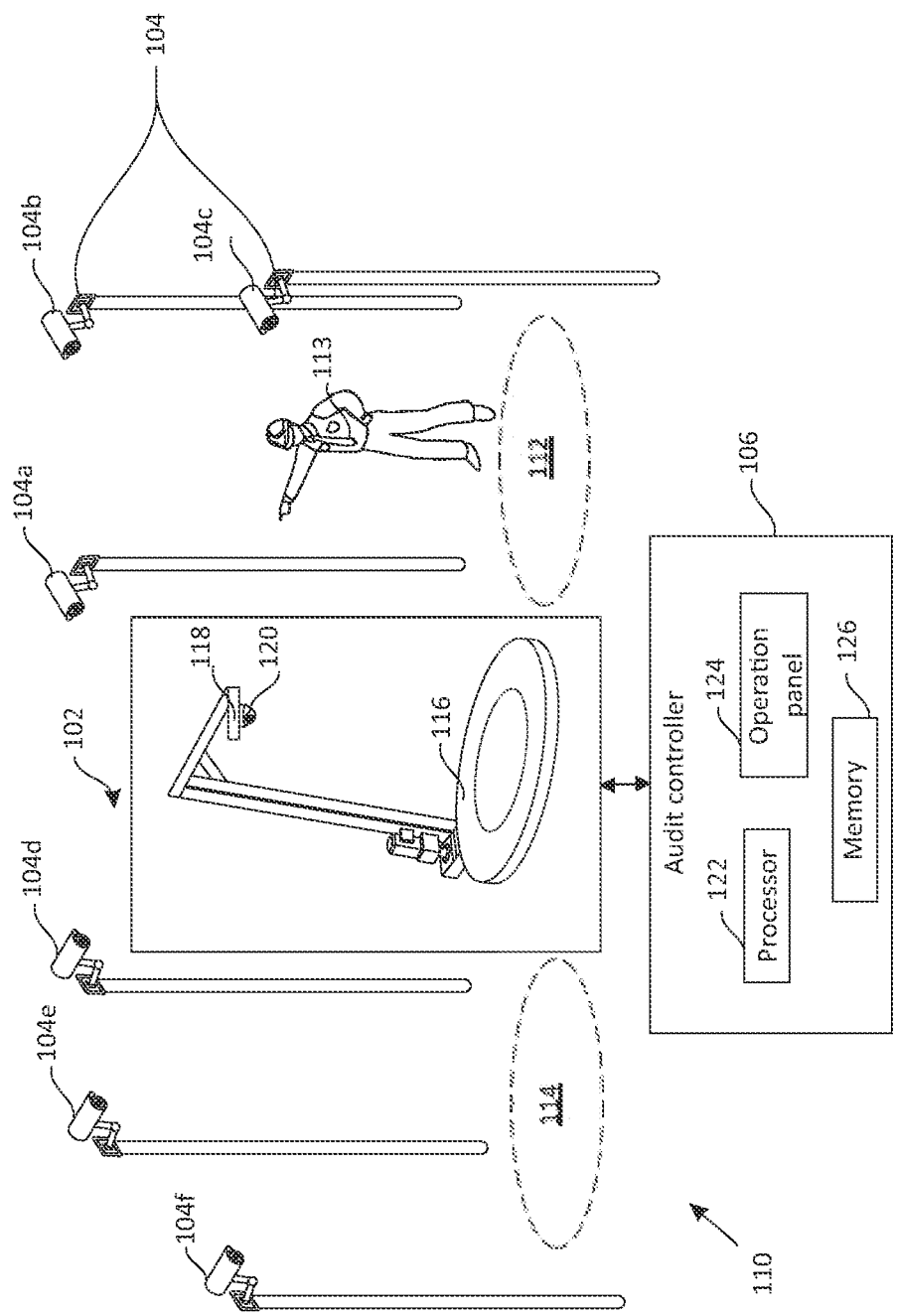
FIG. 1B illustrates a warehousing environment 110, wherein the system 100 can be used.

FIG. 1B illustrates a warehousing environment 110, wherein the system 100 can be used. The warehousing environment 110 pertains to an order receiving and auditing zone of a warehouse that accepts and stores incoming inventory of various types of goods. The warehousing environment 110 includes the audit robot 102 surrounded by a multi-camera tracking system 104 including first through sixth cameras 104a till 104f, and controlled by the audit controller 106. The warehousing environment 110 further includes a delivery personnel waiting area 112 in front of the audit robot 102, and a manual audit area 114 behind the audit robot 102. In the delivery personnel waiting area 112, a delivery personnel 113 delivering a pallet of goods may wait for completion of auditing of their goods by the audit robot 102. In the manual edit area 114, one or more pallets may be dropped to enable the operators (personnel) to perform manual auditing of received goods. The delivery personnel waiting area 112 and the manual edit area 114 may be fully covered by the field of view of cameras 104a till 104f to enable full tracking activity of the delivery personnel 113 and other employees present therein.

The audit robot 102 includes a platform 116 to receive one or more pallets, and an arm 118 to overhang an image sensor 120 positioned to view a pallet kept on the rotating platform 116. In the context of the present disclosure, a pallet is a flat transport structure, which supports goods in a stable fashion while being lifted by a forklift, a pallet jack, a front loader, a jacking device, or an erect crane. A pallet is the structural foundation of a unit load which allows handling and storage efficiencies.

In one embodiment of the present disclosure, the platform 116 is rotatable with respect to the floor. In another embodiment of the present disclosure, the platform 116 is fixed with respect to the floor. Although not shown, the vertical segment of the arm 118 may hold a row of image sensors and barcode scanners for lateral imaging or barcode detecting of the products kept on the platform 116.

In one embodiment of the present disclosure, the audit controller 106 is external to the audit robot 102. In another embodiment of the present disclosure, the audit controller 106 is an integral component of the audit robot 102. The audit controller 106 includes a processor 122, an operation panel 124, and a memory 126. The processor 122 may include a computer, microcontroller, or other circuitry that controls the operations of various components such as the operation panel 124, and the memory 126. The processor 122 may execute software, firmware, and/or other instructions, for example, that are stored on a volatile or non-volatile non-transitory computer readable medium, such as the memory 126, or otherwise provided to the processor 122. The processor 122 may be connected to the operation panel 124, and the memory 126, through wired or wireless connections, such as one or more system buses, cables, or other interfaces. In an embodiment of the present disclosure, the processor 122 may include a custom Graphic processing unit (GPU) server software to process images captured by the multi-tracking camera system 104.

The operation panel 124 may be a user interface and may take the form of a physical keypad or touchscreen. The operation panel 124 may receive inputs from one or more users relating to selected functions, preferences, and/or authentication, and may provide and/or receive inputs visually and/or audibly. The memory 124, in addition to storing instructions and/or data for use by the processor 122, may also include user information associated with one or more users of the warehousing environment 110. For example, the user information may include authentication information (e.g. username/password pairs), user preferences, and other user-specific information. The processor 122 may access this data to assist in providing control functions (e.g. transmitting and/or receiving one or more control signals) related to operation of the operation panel 124, and the memory 126.

In an embodiment of the present disclosure, the processor 122 may be capable of executing machine learning algorithms such as deep neural networks to detect/classify the images of the pallet kept on the platform 116. These algorithms may include but are not limited to, open box detectors, box features detectors (i.e. colour, size etc.), box detectors and counters, overall pallet classification of images and specifically packed pallets such as coca-cola.

In an embodiment of the present disclosure, the processor 122 may control the rotation of the platform 116 by rotating the platform 116 at a variable speed to match the detection/classification process speed while minimizing the time spent auditing.

In an embodiment of the present disclosure, the processor 122 may receive and process images generated by the multi-camera tracking system 124 for facilitating auditing of goods delivered in the delivery personnel waiting area 112.

In operation, the multi-tracking camera system 104 captures images of the delivery personnel 113, and a delivered pallet when the delivery personnel 113 enters through a dedicated door with the pallet into the delivery personnel waiting area 112. The processor 122 receives and processes the images to detect the delivery personnel 113 and delivered pallet using an image segmentation and classification algorithm based on a trained deep neural network. Thereafter, the processor 122 assigns a temporary identification number to both the delivery personnel 113 and the pallet based on a video tracking algorithm, and keep these identifiers attached to a corresponding image object. An image object is a region in an image that is associated with an object or entity existing in the image. The temporary identification is temporary because it is not associated with an identified person, but with an instance of a person existing in the environment 100 for a while. In an example, if the delivery personnel 113 exits the environment 110 and enters again, it will be associated with a new identification number. The video tracking algorithm is an algorithm used to identify instances of an entity along multiple images frames.

The processor 122 may be further provided with a facial identification subsystem and an identification database which can be used to augment the audit process. In an example, the identification database may store the facial identification parameters of the delivery personnel 113 and correlate the same with metadata such as images of goods/pallets previously delivered, types of goods delivered if identifiable visually, previous audit outcomes or risk levels.

Further, the processor 122 assesses the pallet at the door to detect a risk level. In an embodiment of the present disclosure, the delivery personnel history may be used to assess the risk level if face recognition was used. In an example, the delivery personnel history may indicate that whether the delivery personnel/supplier has been detected before with incomplete or tampered pallets. Each delivery from a delivery personnel 113 generates a new history event, which includes the delivery personnel history. Each event is associated with information such as «OK», «tampered pallet» or «number of missing items on the pallet». Further, each type of event is assigned a risk weight (RW). In an example, RW=0 for "OK", RW=1 for "tampered pallet" and RW=5 for "number of missing items on the pallet". After a number of N deliveries, the risk R of the delivery personnel 113 can be defined based on the following:

$$R = \frac{\sum_{i=1}^{N} RW_i}{N} \quad (1)$$

In one scenario, when the pallet is being identified as being intact, i.e. no boxes are opened or no other signs of tampering are found, the delivery personnel 113 may be directed to drop the pallet in the designated storage area.

In another scenario, the pallet or delivery personnel 113 may be chosen for auditing either triggered by an Enterprise Resource Planning (ERP) system, randomly or by any external system such as the retailer specific system, and the delivery personnel 113 is directed to the audit robot 102 or to the manual audit area 114. The delivery personnel 113 may be provided instructions to go to the audit robot 102 through a user interface of the operation panel 124, or through speakers installed therein. When the delivery personnel 113 reaches the audit robot 102, he may place the pallet on the platform 116.

Upon placing of the pallet on the platform 116, the processor 122 may rotate the platform 116 and enable capturing of a 360° view as well as a top-down view of the pallet. The processor 122 may trigger the multi-camera tracking system 104, and/or the image sensor 120 installed on the arm 118 to capture multiple views of the pallet. The processor 122 may further trigger barcode scanners/detectors installed on the arm 118 to automatically read the barcodes on the boxes of the pallet, while the pallet is being rotated. The processor 122 processes the image data, scanning data, order and supplier information, and historical information, along with other metadata such as time, delivery personnel/supplier/order identity to assess a risk level of the pallet. The order and supplier information may include products and quantifiers expected to be delivered, whereas historical information may include learned information based on previous audits followed by human auditor feedback.

In an embodiment of the present disclosure, the processor 122 uses various pre-learned features, such as images of open boxes, box detector and size and colour of the classifier to count the delivered boxes, and assess the correct size/colour of the boxes seen in the images. When the size and content of the pallet is always the same for a supplier/delivery personnel, the whole image of the pallet may be assessed automatically to determine whether the right pallet has been delivered or the pallet has been tampered with. Based on the assessment, a risk level associated with the delivery, may be determined.

In another embodiment of the present disclosure, the processor 122 may track the delivery personnel 113, and ensure that the delivery personnel 113 or other staff member do not interfere with the audit process. This may be done using the overhead camera 120 and also by aggregating the views from all other cameras of the multi-camera tracking system 104. The processor 122 may also be integrated with an alert/alarm system (not shown) to generate an alert/alarm, when a process breach occurs. The process breach may pertain to any deviation in the behaviour of the delivery personnel 113 with respect to a predefined expected behaviour. According to an expected behaviour, the delivery personnel 113 is supposed to enter a store distribution area with the pallet, remain in a confined part of the distribution area, not interact with store stuff, not open the pallet, not take objects from the distribution area and so on. A process breach occurs if the processor 122 detects that the delivery personnel 113 gives or receives any object from store.

When the determined risk level is zero, i.e. when the pallet is detected as being intact and matches the expected size and content, the processor 122 may automatically check-in the pallet, and instruct the delivery personnel 113 to leave the pallet at a designated area and leave. In an embodiment of the present disclosure, the processor 122 may guide the delivery personnel 113 via dynamic signage. The dynamic signage may include a blinking LED light marked path, or a light-projected blinking path, guiding the delivery personnel to the designated area.

The processor 122 may detect if the delivery personnel 113 tampers with the pallet while moving the palate between the audit robot 102 and the storage designated area. This may be done by tracking both the delivery personnel 113 and the pallet and measuring the distance between the two, detecting stops/time spent stopped between the audit robot 102 and storage area, or by using classifiers capable of detecting humans tampering/interfering with the content of pallets. After the delivery personnel 113 leaves the pallet at the designated storage area, the delivery personnel 113 may be tracked to ensure that he leaves the premises in the shortest time and does not interact/interfere with equipment, employees or other pallets.

The processor 122 may further track the delivery personnel 113 to ensure that he leaves the warehouse environment 110 after the pallet has been received in the designated storage area, and does not interfere with other pallets or spend time speaking with other employees. In an example, when the delivery personnel 113 first enters the field of view of the multi-camera tracking system 104, the delivery personnel's object ID is passed from the camera that already identified it, if true, based on spatial registration of the camera views and position of the delivery personnel 113. The delivery personnel 113 is deemed to have left safely if he was last detected by a camera at a location near the exit door. In an embodiment of the present disclosure, pose estimation algorithms may be used to detect accidents such as tripping, falling etc.

When the determined risk level is non-zero, i.e. when the pallet is being detected as being tampered with, incomplete, or all together risky, the processor 122 may automatically direct the delivery personnel 113 towards the manual audit area 114. In the manual audit area 114, an employee of the organisation may manually check the pallet. In the manual audit, the employee may be asked to input information about the pallet and the missing goods into a predefined UI application of the operation panel 124, and the feedback may be collected for the auto learning process. The information collected from the employee, (also referred to as auditor) may be linked with the images collected and the delivery personnel/supplier identity and may be used to enhance the process for the future. The images containing tampered or incomplete pallets may be collected and classified to be further used for training the processor 122.

Figure 2:
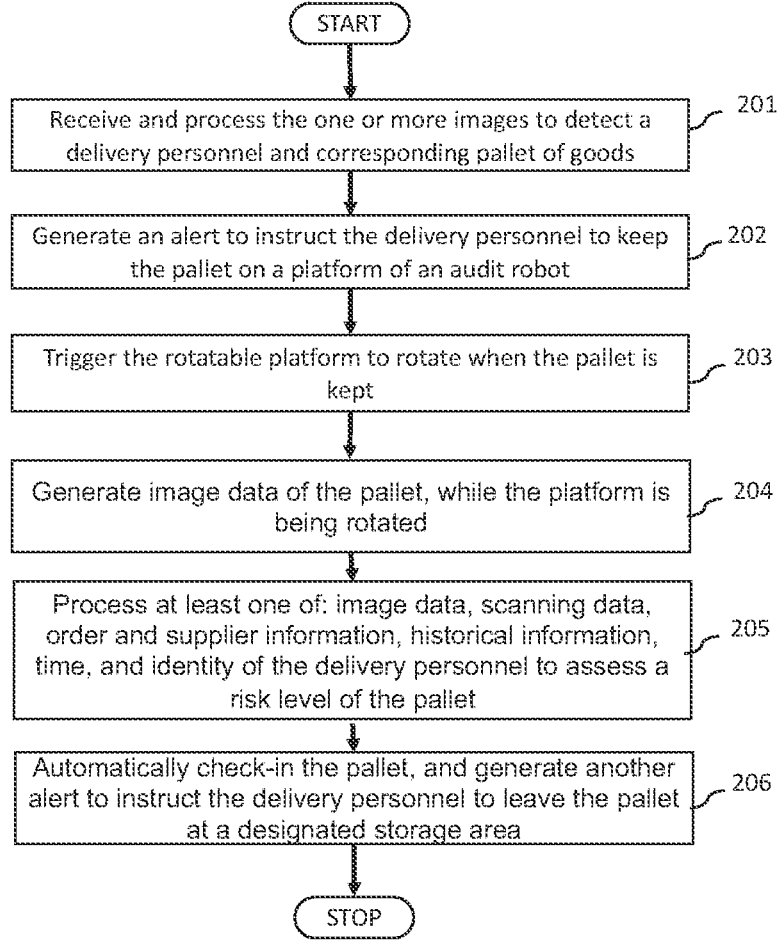
FIG. 2 is a flowchart illustrating a method for performing automated auditing of goods delivered using the system of FIG. 1A, in accordance with an embodiment of the present disclosure.

FIG. 2 is a flowchart illustrating a method for automated auditing of goods in a warehousing environment, in accordance with an embodiment of the present disclosure.

At step 201, one or more images are received and processed to detect a delivery personnel and corresponding pallet of goods when the delivery personnel enters the warehousing environment. In an embodiment of the present disclosure, a temporary identification number is assigned to both the delivery personnel and the pallet using a video tracking algorithm, and the temporary identification number is associated with corresponding one or more images. Further, facial identification parameters of the delivery personnel are stored, and the facial identification parameters of the delivery personnel are correlated with one or more images of one or more pallets previously delivered by the delivery personnel, types of goods delivered by the delivery personnel, and previous risk levels of the delivery personnel.

At step 202, an alert is generated to instruct the delivery personnel to keep the pallet on a platform of an audit robot. At step 203, the rotatable platform is triggered to rotate when the pallet is kept. In an embodiment of the present disclosure, a rotation of the platform is controlled by rotating the platform at a variable speed to match a speed of detection of the detection and classification process.

At step 204, image data of the pallet is generated, while the platform is being rotated through an overhead sensor, or the multi-camera tracking system. At step 205, at least one of: image data, scanning data, order and supplier information, historical information, time, and identity of the delivery personnel is processed to assess a risk level of the pallet. At step 206, the pallet is automatically checked-in, and another alert is generated to instruct the delivery personnel to leave the pallet at a designated storage area of the warehousing environment when the risk level is assessed as zero. In an embodiment of the present disclosure, the another alert includes a dynamic signage including at least one of: a blinking LED light marked path, and a light-projected blinking path, for guiding the delivery personnel to the designated storage area.

Various embodiments of the present disclosure provide an Intelligent risk-based audit process based on historic feedback loop combined with a learning process, integrated multi-camera tracking system 104 for wide coverage area of the process audit system, and auditing robot 102 for auditing, risk assessment and triage. The audit robot 102 for triage is the automatic auditing robot able to classify the pallets based on their integrity. The triage is the process of assigning history data, and using the whole history data to re-evaluate the delivery personnel's risk, and then making a decision to direct the pallet to audit robot, manual check or directly to the store.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for performing automated auditing of goods in a warehousing environment, comprising:
   an audit robot comprising:
      a rotatable platform; and
      an overhead camera configured to capture an overhead image of the rotatable platform;
      one or more barcode scanners for detecting barcodes of the one or more goods kept on the rotatable platform;
   a multi-tracking camera system including a plurality of cameras installed in the warehousing environment to capture one or more images of the warehousing environment; and
   an audit controller comprising:
      a memory to store one or more instructions; and
      a processor communicatively coupled to the memory, and configured to execute the one or more instructions stored in the memory to:
      receive and process the one or more images to detect a delivery personnel and corresponding pallet of goods when the delivery personnel enters the warehousing environment;
      generate an alert to instruct the delivery personnel to keep the pallet on the platform of the audit robot;
      trigger the rotatable platform to rotate when the pallet is kept;
      trigger the overhead sensor and the multi-tracking camera system to generate image data of the pallet, while the platform is being rotated;
      trigger the one or more barcode scanners to automatically read one or more barcodes of one or more goods on the pallet, while the pallet is being rotated;
      process at least one of: image data, scanned barcode data, order and supplier information, historical information, time, and identity of the delivery personnel to assess a risk level of the pallet; and automatically check-in the pallet, and generate another alert to instruct the delivery personnel to leave the pallet at a designated storage area of the warehousing environment when the risk level is assessed as zero.

2. The system of claim 1, wherein the processor is configured to execute machine learning algorithms to detect and classify the images of one or more goods kept on the platform.

3. The system of claim 2, wherein the processor is configured to control a rotation of the platform by rotating the platform at a variable speed to match a speed of detection of the detection and classification process.

4. The system of claim 1, wherein the processor is configured to assign a temporary identification number to both the delivery personnel and the pallet using a video tracking algorithm, and associate the temporary identification number to corresponding one or more images.

5. The system of claim 3, wherein the processor is further configured to store facial identification parameters of the delivery personnel, and correlate the facial identification parameters of the delivery personnel with one or more images of one or more pallets previously delivered by the delivery personnel, types of goods delivered by the delivery personnel, and previous risk levels of the delivery personnel.

6. The system of claim 1, wherein the another alert includes a dynamic signage including at least one of: a blinking LED light marked path, and a light-projected blinking path, for guiding the delivery personnel to the designated storage area.

7. The system of claim 6, wherein the processor is further configured to:
track the delivery personnel from the audit robot location to the designated storage area to detect a tempering of the pallet by the delivery personnel based on the image data from the multi-camera tracking system; and
track the delivery personnel from the designated storage area to an exit, after the pallet is being dropped at the designated storage based on the image data from the multi-camera tracking system.

8. The system of claim 1, wherein the processor is further configured to generate an alert to instruct the delivery personnel to a manual auditing area when the risk level is assessed to be non-zero.

9. A method for performing automated auditing of goods in a warehousing environment, comprising:
receiving and processing the one or more images to detect a delivery personnel and corresponding pallet of goods when the delivery personnel enters the warehousing environment;
generating an alert to instruct the delivery personnel to keep the pallet on a platform of an audit robot;
triggering the rotatable platform to rotate when the pallet is kept;
generating image data of the pallet, while the platform is being rotated;
automatically reading one or more barcodes of one or more goods on the pallet, while the pallet is being rotated;
processing at least one of: image data, scanned barcode data, order and supplier information, historical information, time, and identity of the delivery personnel to assess a risk level of the pallet; and automatically checking-in the pallet, and generating another alert to instruct the delivery personnel to leave the pallet at a designated storage area of the warehousing environment when the risk level is assessed as zero.

10. The method of claim 9 further comprising executing machine learning algorithms to detect and classify the images of one or more goods kept on the platform.

11. The method of claim 10 further comprising controlling a rotation of the platform by rotating the platform at a variable speed to match a speed of detection of the detection and classification process.

12. The method of claim 9 further comprising assigning a temporary identification number to both the delivery personnel and the pallet using a video tracking algorithm, and associating the temporary identification number to corresponding one or more images.

13. The method of claim 12 further comprising storing facial identification parameters of the delivery personnel, and correlating the facial identification parameters of the delivery personnel with one or more images of one or more pallets previously delivered by the delivery personnel, types of goods delivered by the delivery personnel, and previous risk levels of the delivery personnel.

14. The method of claim 9, wherein the another alert includes a dynamic signage including at least one of: a blinking LED light marked path, and a light-projected blinking path, for guiding the delivery personnel to the designated storage area.

15. The method of claim 14 further comprising:
tracking the delivery personnel from the audit robot location to the designated storage area to detect a tempering of the pallet by the delivery personnel based on the image data;
tracking the delivery personnel from the designated storage area to an exit, after the pallet is being dropped at the designated storage based on the image data.

16. The method of claim 15 further comprising generating an alert to instruct the delivery personnel to a manual auditing area when the risk level is assessed to be non-zero.

17. A computer programmable product for performing automated auditing of goods in a warehousing environment, the computer programmable product comprising a set of instructions, the set of instructions when executed by a processor causes the processor to:
receive and process the one or more images to detect a delivery personnel and corresponding pallet of goods when the delivery personnel enters the warehousing environment;
generate an alert to instruct the delivery personnel to keep the pallet on a platform of an audit robot;
trigger the rotatable platform to rotate when the pallet is kept;
generate image data of the pallet, while the platform is being rotated;
automatically read one or more barcodes of one or more goods on the pallet, while the pallet is being rotated
process at least one of: image data, scanned barcode data, order and supplier information, historical information, time, and identity of the delivery personnel to assess a risk level of the pallet; and
automatically check-in the pallet, and generate another alert to instruct the delivery personnel to leave the pallet at a designated storage area of the warehousing environment when the risk level is assessed as zero.

* * * * *